UNITED STATES PATENT OFFICE.

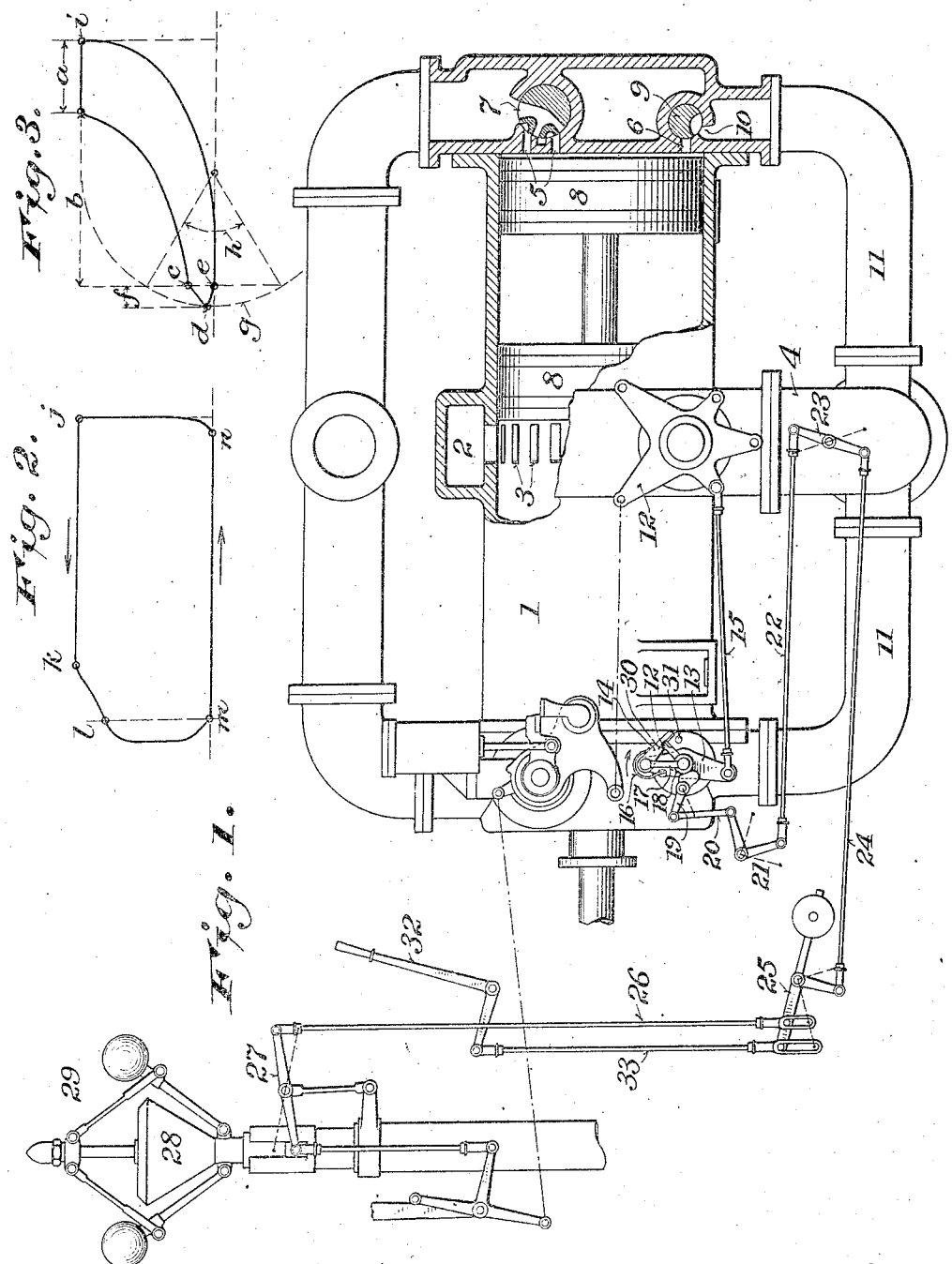

BRUNO V. NORDBERG, OF MILWAUKEE, WISCONSIN.

ENGINE.

1,157,029.

Specification of Letters Patent.

Patented Oct. 19, 1915.

Application filed January 28, 1914. Serial No. 814,883.

*To all whom it may concern:*

Be it known that I, BRUNO V. NORDBERG, a citizen of the United States, residing at Milwaukee, in the county of Milwaukee and State of Wisconsin, have invented certain new and useful Improvements in Engines, of which the following is a specification, reference being had to the accompanying drawing, forming a part thereof.

This invention relates more particularly to engines of the central exhaust type, which are usually provided with condensers.

The main object of the invention is to provide for eliminating or reducing compression on the return strokes of the piston in an engine of this type, in order that it may be maneuvered or its operation controlled with precision.

It consists in the provision of a central exhaust port engine with auxiliary exhaust valves and with means for bringing such valves into operation so as to eliminate or reduce compression when the engine is run slowly and it is desired to control its operation with precision, and it consists further in the peculiar construction, arrangement and combination of parts as hereinafter particularly described and pointed out in the claims.

In the accompanying drawing like characters designate the same parts in the several figures.

Figure 1 is a view partly in side elevation and partly in vertical axial section of a portion of an engine embodying the invention; and Figs. 2 and 3 are diagrams illustrating the operation of the engine.

In engines of the mid-cylinder or central exhaust type there are ordinarily no exhaust valves, but the piston, which is of somewhat less length than the length of the cylinder and the stroke of the piston is adapted to uncover the central exhaust port and thereby alternately open the opposite ends of the cylinder to exhaust as the piston approaches the ends of its stroke and its movement is reversed. The exhaust port is opened for a comparatively short time, from about one-tenth to about one-sixth of the period of one revolution of the crank shaft. On the return strokes of the piston the steam confined in the cylinder is compressed. Fig. 3 showing an indicator diagram illustrates the distribution of the steam or working fluid in the cylinder of an engine of this kind when running under normal conditions. In this diagram *a* represents the admission period, and *b* the expansion period. At the point *c* the piston begins to uncover the exhaust port. At *d* the piston reaches the end of its working stroke, and on its return stroke at the point *e*, closes the exhaust port, so that during the period while the piston is traveling the distance *f* on its forward or working stroke and back the same distance on its return stroke, the exhaust port is opened. The path described by the crank pin of the engine is partially indicated on this diagram by the dotted line *g*, and the period during which the exhaust valve is open, by the angle *h*. On the return stroke of the piston from the point *e* to its end, the steam or working fluid is compressed as indicated by the curved line *e—i*. In an engine of this kind, however, the supply of the steam or working fluid to the cylinder is controlled and regulated, the compression is substantially constant, and progresses according to the line *e—i*. If such an engine is used for hoisting or similar purposes where it is necessary to maneuver or control its operation with precision so that it can be run backward or forward at very low speed, and where it is necessary to stop with accuracy at certain points in the stroke of the piston, the compression above mentioned is a very troublesome factor, making it impossible to stop the engine with precision and also difficult to start it.

Referring to Fig. 1 of the drawing, 1 designates an engine cylinder surrounded at the center by a belt or passage 2 and having a circumferential series of openings 3 communicating with said passage and forming the main mid-cylinder or central exhaust port. The main exhaust pipe 4 is attached to the cylinder and communicates with the passage 2. At its ends the cylinder is provided with inlet ports 5 and auxiliary exhaust ports 6. These are preferably formed as shown, in the cylinder heads. The inlet ports are controlled by rotative or other suitable valves 7, one of which is shown at the right, and these valves may be operated under the control of the governor, by Corliss or other suitable valve gear, as shown at the left, Fig. 1.

As engines of this type usually have a long cylinder and piston stroke, the piston, which must consequently be comparatively long, preferably consists of two heads 8, separated by an insulating space with which the mid exhaust port 3 communicates on each stroke of the piston and in which a vacuum or partial vacuum is thus produced and maintained while the engine is in operation. This construction not only reduces the weight of the piston, but also obstructs the passage of heat through it from one end of the cylinder to the other. However, for engines of comparatively short stroke the piston may be made with a solid or single head.

The auxiliary exhaust ports 6 are controlled by rotative valves 9, registering with ports 10, which communicate with branch pipes 11 connected with the main exhaust pipe 4. The exhaust valves 9, which are of comparatively small size, are operated from a wrist plate 12 by mechanism resembling Corliss valve gear, as shown at the left, Fig. 1. As the exhaust valves and operating mechanism are the same at both ends of the cylinder, that at one end only will be specifically described. This mechanism comprises a rocker arm 12', which is fixed on the valve stem and is provided with a trip steel or block, a rocking valve actuating lever 13, which is fulcrumed on the valve bonnet concentrically with the valve stem, and a trip hook 14, which is pivoted to the lever 13 and provided with a trip steel or block adapted to coöperate with the trip steel or block on the arm 12' to open the associated valve 9. The lever 13 is connected by a rod 15 with the wrist plate 12. A spring 16 or other suitable device, tends to hold the trip hook 14 in position to coöperate with the arm 12', for opening the valve 9. The hook 14 has an arm 17, provided with a roller 18 for turning and holding the hook out of operative position for opening the valve. The arm 17 is of such length and is of such angular relation to the hook that when the hook is in operative position for opening the valve, the roller 18 will be in axial alinement with the valve stem, as shown.

A knock-off or releasing cam or lever 19, fulcrumed on the valve bonnet or other part of the engine, is adapted in one position, as shown by full lines, Fig. 1, to release the trip hook 14 and permit it to open the valve 9, and in another position, indicated by a dotted line, to throw and hold said hook out of operative position for opening the valve. The cam or lever 19 is connected by a system of levers and rods 20, 21, 22, 23, 24, 25, 26 and 27 with the counterpoise 28 of a centrifugal governor 29, so that when the engine runs slowly and the counterpoise is down, the knock-off or releasing lever will be held in the position in which it is shown by full lines, and the auxiliary exhaust valve will be opened during the latter part of the return stroke of the piston, and closed during the working stroke of the piston, but when the engine runs at normal or high speed, and the counterpoise of the governor is lifted, the knock-off or releasing lever 19 will be held in the position indicated by the dotted line, thereby preventing engagement of the trip steels or blocks and allowing the valve 9 to remain closed during both the working and return strokes of the piston. The hook 14 is formed with a heel or shoulder 30, which in either position of the knock-off or releasing lever 19, is adapted to engage with the arm 12' and close the valve 9, when the lever 13 is moved by the wrist plate in the direction indicated by an arrow, Fig. 1. The valve 9 is arrested and held in closed position by a stop 31 with which the arm 12 engages when the valve is closed by the shoulder 30 on the hook 14.

The lever 25 is weighted, so that when the engine is run slowly and the counterpoise 28 of the governor is down, the cam or lever 19 will be held in releasing position, as shown by full lines on the drawing, thereby causing the auxiliary exhaust valves 9 to open and close as hereinbefore explained. Under these conditions the distribution of steam or other working fluid in the engine cylinder will take place as illustrated by the indicator card or diagram shown in Fig. 2. According to this diagram the admission of steam or other working fluid takes place from $j$ to $k$. From $k$ to $l$ it expands, and at $l$ the central exhaust port is opened and remains open during the period represented by the curved line $l$—$m$. In the meantime, the auxiliary exhaust valve 9 is opened, thereby preventing compression of the steam or working fluid on the return stroke of the piston, so that the exhaust line $m$—$n$ is substantially straight. At $n$ the exhaust valve closes, thereby producing a slight compression, indicated by the curve at the lower end of the line $j$—$n$. If desired, the auxiliary exhaust valves may be closed exactly on dead centers, thus completely eliminating compression. With a distribution of the steam or working fluid, as illustrated by this card or diagram, the engine can be easily maneuvered, and its operation controlled with precision.

When the speed of the engine is increased sufficiently to lift the counterpoise 28 of the governor, and while it continues to run at high or normal speed, the cam or lever 19 will be shifted by its connection with the governor and held in position, as indicated by dotted lines, to prevent the opening of the auxiliary exhaust valves 9, which will remain closed and inactive until the speed of the engine is reduced sufficiently to permit the counterpoise 28 of the governor to drop, as shown by full lines on the drawing. When the engine runs at high or normal speed, distribution of the steam or working fluid will take place in the cylinder, as illustrated by the indicator card or diagram, Fig. 3, and as hereinbefore explained.

For manually shifting the knock-off or releasing cam or lever 19 independently of the governor, a hand lever 32 is connected by a rod 33 with the weighted lever 25, the rods 26 and 33 having slot and pin connections with the lever 25 to permit turning said lever into releasing position by either connection independently of the other.

Various changes in the construction, arrangement and combination of parts may be made without departure from the principle and scope of the invention as defined in the following claims.

I claim:

1. In an engine the combination with a cylinder having a central exhaust port and a piston adapted at the limits of its movement in opposite directions to open said port, of auxiliary exhaust valves, means for operating said valves, and a governor connected with said valve operating means and adapted when the engine runs below a certain speed to cause the opening of said valves during the latter part of the return strokes of the piston.

2. In an engine the combination with a cylinder having a central exhaust port and auxiliary exhaust ports at the ends and a piston adapted adjacent to the limits of its movement in opposite directions to uncover said central port, of valves controlling said auxiliary exhaust ports, valve operating mechanism comprising rocker arms connected with said valves, rocking levers, trip hooks pivoted to said levers and adapted to engage with said arms to open said valves on the latter part of the return strokes of the piston, releasing levers adapted to hold said hooks out of operative position, and means for turning said releasing levers into position to render said valves active or inactive.

3. In an engine the combination with a cylinder having a central exhaust port and a reciprocating piston adapted at the limits of its movement in opposite directions to open said port, of auxiliary rotative exhaust valves, valve gear for opening and closing said valves comprising arms fixed on the valve stems, valve operating levers fulcrumed concentrically with the valve stems, trip hooks pivoted to said levers and adapted to engage with said arms and to open the valves on the latter part of the return strokes of the piston, knock-off levers adapted to turn said trip hooks out of operative position, and a governor connected with said knock-off levers and adapted when the engine attains a certain speed to shift them into releasing position.

4. In an engine the combination with a cylinder having a central exhaust port and auxiliary exhaust ports at the ends, and a piston adapted to uncover said central port adjacent to the limits of the movement of the piston in opposite directions, of valves controlling said auxiliary exhaust ports, valve operating mechanism comprising rocker arms connected with said valves, rocking levers, trip hooks pivoted to said levers and adapted by engagement with said arms to open said valves during the latter part of the return strokes of the piston, releasing levers adapted to hold said hooks out of operative position, and means for shifting said releasing levers into position to render said valves active or inactive, said hooks being provided with shoulders adapted by engagement with said arms to close said valves just before the beginning of the working strokes of the piston in whichever position the releasing levers may be.

5. In an engine the combination with a cylinder having a central main exhaust port, auxiliary exhaust ports at the ends, and a reciprocating piston adapted at the limits of its movement in opposite directions to uncover the central exhaust port, of auxiliary rotative exhaust valves controlling the auxiliary exhaust ports, valve gear for opening and closing said valves comprising arms fixed on the valve stems, valve operating levers fulcrumed concentrically with the valve stems, trip hooks pivoted to said levers and adapted by engagement with said arms to open said valves during the latter part of the return strokes of the piston, knock-off levers adapted to turn said hooks out of operative position, and a governor connected with said knock-off levers and adapted to shift them into releasing position when the engine attains a certain speed, said hooks being provided with shoulders which are adapted to close said valves just before the beginning of the working strokes of the piston, when the knock-off levers are in either position.

6. In an engine the combination with a cylinder having a central exhaust port and auxiliary exhaust ports at the ends and a piston adapted at the limits of its movement in opposite directions to uncover said central port, of valves controlling said auxiliary ports, valve operating mechanism comprising rocker arms connected with said valves, rocking levers whose fulcrums are in axial alinement with the pivots of said arms, trip hooks pivoted to said levers and adapted by engagement with said arms to open said valves during the latter part of the return strokes of the piston, means tending to hold said hooks in operative position for opening the valves, trip arms connected with said hooks and provided with rollers in axial alinement with the fulcrums of said levers when the hooks are in operative position for opening the valves, releasing levers adapted by engagement with said rollers to turn and hold said hooks out of operative position for opening the valves, and means for turning said releasing levers into position to render the valves active or inactive.

7. In an engine the combination with a cylinder having a central exhaust port, auxiliary exhaust ports at the ends and a reciprocating piston adapted at the limits of its movement in opposite directions to uncover the central exhaust port, of auxiliary rotative exhaust valves controlling the auxiliary exhaust ports, valve gear for opening and closing said valves comprising arms fixed on the valve stems, valve operating levers, fulcrumed concentrically with the valve stems, trip hooks pivoted to said levers and adapted by engagement with said arms to open said valves during the latter part of the return strokes of the piston, springs tending to hold said hooks in operative position, trip arms connected with said hooks and provided with rollers in axial alinement with the valve stems when the hooks are in engaging position, knock-off levers adapted by engagement with said rollers to turn and hold said hooks out of operative position, and a governor connected with said knock-off levers and adapted when the engine attains a certain speed to shift them into releasing position.

8. In an engine the combination of a cylinder having a central exhaust port and auxiliary exhaust ports at the ends and a piston adapted at the limits of its movement to open said central port to opposite ends of the cylinder, of valves controlling said auxiliary ports, valve operating mechanism comprising rocker arms connected with said valves, rocking levers having their fulcrums in axial alinement with the pivots of said arms, trip hooks pivoted to said levers and adapted by engagement with said arms to open the valves during the latter part of the return strokes of the piston, said hooks having shoulders adapted to close the valves just before the beginning of the working strokes of the piston, stops for arresting and holding said arms with the valves in closed position, releasing levers adapted to turn and hold said hooks out of operative position, and means for turning said releasing levers into position to render the valves active or inactive.

9. In an engine the combination with a cylinder having a central exhaust port, auxiliary exhaust ports at the ends and a reciprocating piston adapted at the limits of its movement in opposite directions to uncover the central exhaust port, of auxiliary rotative exhaust valves controlling the auxiliary exhaust ports, valve gear for opening and closing said valves comprising arms fixed on the valve stems, valve operating levers fulcrumed concentrically with the valve stems, trip hooks pivoted to said levers and adapted by engagement with said arms to open said valves during the latter part of the return strokes of the piston, said hooks being provided with shoulders which are adapted to close said valves just before the beginning of the working strokes of the piston, stops for arresting and holding said valves in closed position, knock-off levers adapted to turn said hooks out of operative position, and a governor connected with said knock-off levers and adapted when the engine attains a certain speed to shift them into releasing position.

10. In an engine the combination of a cylinder having a central exhaust port and auxiliary exhaust ports at the ends and a piston adapted at the limits of its movement to open said central port to opposite ends of the cylinder alternately, of valves controlling said auxiliary exhaust ports, valve operating and releasing mechanism adapted to open said valves during the latter part of the return strokes of the piston and to close them during the working strokes of the piston, a weighted lever connected with said valve operating and releasing mechanism and tending to hold the same in releasing condition, and means for shifting said weighted lever into position to cause said mechanism to open said valves.

11. In an engine the combination with a cylinder having a central exhaust port, auxiliary exhaust ports at the ends and a piston adapted at the limits of its movement in opposite directions to uncover the central exhaust port, of auxiliary exhaust valves controlling the auxiliary exhaust ports, valve operating and releasing gear adapted to open the auxiliary exhaust valves during the latter part of the return strokes of the piston and to close said valves during the working strokes of the piston, a weighted lever connected with the valve operating and releasing gear and tending to prevent the opening of said exhaust valves, and a governor connected with said weighted lever and adapted when the engine attains a certain speed to shift said weighted lever to cause the valve gear to open the exhaust valves during the latter part of the return strokes of the piston.

12. In an engine the combination of a cylinder having a central exhaust port and auxiliary exhaust ports at the ends and a piston adapted at the limits of its movement to alternately open said central port to opposite ends of the cylinder, of valves controlling said auxiliary ports, valve operating mechanism comprising rocker arms connected with said valves, rocking levers, hooks pivoted to said levers and adapted by engagement with said arms to open the valves during the latter part of the return strokes of the piston, trip arms connected with said hooks and provided with rollers which are in axial alinement with the fulcrums of said levers when the hooks are in engaging position, releasing levers adapted by engagement with said rollers to turn and hold said hooks out of engaging position, and means for manually shifting said releasing levers into position to prevent opening said valves.

13. In an engine the combination with a cylinder having a central exhaust port, auxiliary exhaust ports at the ends and a piston adapted at the limits of its stroke to uncover the central port, of valves controlling said auxiliary exhaust ports, means for operating said valves, a governor connected with said valve operating means and adapted when the engine attains a certain speed to automatically arrest the operation of said valves and when the engine runs below that speed to automatically cause the opening of said valves during the latter part of the return strokes of the piston, and a connection for manually releasing the valve operating gear to permit the valves to remain closed independently of the governor.

In witness whereof I hereto affix my signature in presence of two witnesses.

BRUNO V. NORDBERG.

Witnesses:
 CHAS. L. GOSS,
 E. C. BAYERLEIN.